United States Patent [19]

Suzuki et al.

[11] 4,038,257
[45] July 26, 1977

[54] URETHANE MODIFIED ACRYLATE RESIN AND PROCESS FOR THE PRODUCTION THEREOF

[75] Inventors: Hajime Suzuki; Hideo Miyake, both of Otsu, Japan

[73] Assignee: Toyo Boseki Kabushiki Kaisha, Osaka, Japan

[21] Appl. No.: 615,098

[22] Filed: Sept. 19, 1975

[30] Foreign Application Priority Data

Sept. 25, 1974 Japan .................................. 49-110753

[51] Int. Cl.$^2$ ............................................. C08G 63/12
[52] U.S. Cl. .......................... 260/75 NK; 260/75 NP; 260/77.5 MA
[58] Field of Search ..... 260/75 NK, 75 NP, 77.5 MA

[56] References Cited

U.S. PATENT DOCUMENTS

| | | | |
|---|---|---|---|
| 3,006,897 | 10/1961 | Parker | 260/75 NK |
| 3,305,495 | 2/1967 | Vom Orde | 260/2.3 |
| 3,509,234 | 4/1970 | Burlant et al. | 260/859 |

*Primary Examiner*—Lewis T. Jacobs

*Attorney, Agent, or Firm*—Birch, Stewart, Kolasch and Birch

[57] ABSTRACT

A urethane modified acrylate resin and the process for the production of the said urethane modified acrylate resin, wherein the said urethane modified acrylate is expressed by the following general formula (I),

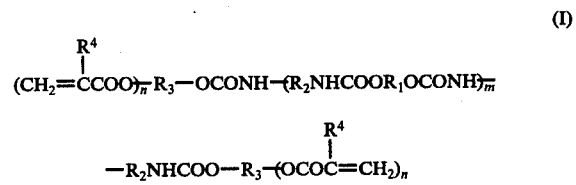

(wherein $R_1$ is a terephthalic oligoester residue, $R_2$ is an organic diisocyanate residue, $R_3$ is a polyhydric alcohol residue, $R_4$ is a hydrogen atom or a methyl group, $m$ is a number not more than 5 and $n$ is an integer from 1 through 4), which is characterized by high elongation, high strength and excellent corrosion resistance and are useful for the production of castings, moldings, adhesives, coatings, primers, varnishes, inks and the like.

13 Claims, No Drawings

URETHANE MODIFIED ACRYLATE RESIN AND PROCESS FOR THE PRODUCTION THEREOF

FIELD OF THE INVENTION

The present invention relates to a curable urethane modified acrylate resin (the urethane modified acrylate here includes a urethane modified methacrylate) which is characterized by high elongation, high strength and excellent corrosion resistance and is useful for the production of castings, moldings, coatings, primers, varnishes, inks and the like.

BACKGROUND OF THE INVENTION

As one type of the thermosetting resins, varieties of the unsaturated polyester resin prepared by reacting an unsaturated dicarboxylic acid or a mixture of an unsaturated and a saturated dicarboxylic acid with a glycol to obtain an unsaturated polyester and dissolving the unsaturated polyester in a polymerisable monomer such as styrene have hitherto been developed and have found wide uses in such fields as fiber reinforced plastics.

However, in such an unsaturated polyester resin, two opposing requirements of high elongation and high strength of the cured resin have never been satisfied simultaneously and the prospect for satisfying the both requirements is estimated to be very poor.

In recent years, some urethane modified acrylate resins have been developed as novel thermosetting resins. These resins, however, failed to satisfy the two opposing requirements of both excellent physical properties such as high elongation and high strength and excellent corrosion resistance of the cured resin.

As an example of the above urethane modified acrylate resin, the Japanese Patent Publication No. 14,805/1964 discloses that a curable urethane modified acrylate resin useful for adhesives and coatings which is obtained by reacting an organic isocyanate containing one or more isocyanate group in the molecule with an equivalent amount of an α-substituted monoacrylate of glycol is homopolymerized or copolymerized by using an initiator with the other vinyl compound to obtain a polymer. The organic isocyanate specifically shown in the above patent is a pure organic diisocyanate or a compound derived by reacting a polyhydric alcohol such as ethylene glycol, polyethylene glycol, trimethylolpropane and unsaturated polyester glycol having an average molecular weight of 1000 with an excess amount of organic diisocyanate. When a pure organic diisocyanate is used in the above reaction, however, a resin of neither high elongation nor high corrosion resistance can be obtained. When a compound derived by reacting ethylene glycol and an organic diisocyanate is used in the above reaction, the resin obtained is of inferior elongation, hard, brittle and also inferior in corrosion resistance. When a compound derived by reacting polyethylene glycol and an organic diisocyanate is used in the same reacion the resin obtained is inferior in heat resistance, corrosion resistance and hardness. When a compound derived by reacting trimethylolpropane and an organic diisocyanate is used in the same reaction, the resin obtained is not sufficient in elongation and inferior in corrosion resistance. When a compound derived by reacting an unsaturated polyester glycol and an organic diisocyanate is used in the same reaction, a resin of high elongation cannot be obtained.

As another example, the Japanese Patent Publication No. 15,629/1970 discloses a coating solution which consists of a vinyl monomer and a urethane modified organic resin and is useful as a radiation curable paint, binder, wherein the urethane modified organic resin is prepared by reacting a polymer containing hydroxyl group with one isocyanate group in the diisocyanate to form a polymer having an isocyanate group at the end of the molecular chain and thereafter reacting at least a part of the remaining isocyanate group in the above diisocyanate with a acrylate or methacrylate containing hydroxyl group to introduce some α, β-olefinic unsaturated bonds separated by two urethane bonds from the carbon - carbon main chain in the above polymer. In preparing the above coating solution, the polymer containing hydroxyl group is either an unsaturated polyester or a saturated polyester. When an unsaturated polyester is used, a resin of high elongation cannot be obtained. When, on the other hand, a saturated polyester, specifically a polyester consisting of a polyhydric alcohol and an aliphatic dicarboxylic acid such as succinic acid and adipic acid is used, the resin obtained is inferior in heat resistance and corrosion resistance.

A further example is the Japanese Patent Publication No. 28,533/1973 which discloses a solution consisting of a urethane prepolymer and an ethylenically unsaturated monomer useful as a light curable coating composition, wherein the compound obtained by reacting polyethylene isophthalate with an organic diisocyanate is further reacted with ethylene glycol monomethacrylate to form the above urethane prepolymer. A coating having high elongation, however, can not be obtained from the above composition.

On the other hand, high molecular weight saturated polyesters, such as polyethleneterephthalate, polyethyleneterephthalate-isophthalate, polybutyleneterephthalate and polyethylene2,2-dimethylpropyleneterephthalate, are used in various fields such as fibers, molding materials, films, adhesives, paints, varnishes and plasticizers, resulting in the formation of considerable large quantities of various polyester wastes in the course of the production of such products. The reclamation or utilization of such polyester wastes are highly desirable in view of the saving of resources expected.

SUMMARY OF THE INVENTION

Accordingly, the first object of the present invention is to provide a urethane modified acrylate resin which is characterized by high elongation, high strength and excellent corrosion resistance and is useful for the production of castings, moldings, adhesives, coatings, primers, varnishes, inks and the like.

The other object of the present invention is to reproduce a material of high commercial value by reclaiming high molecular weight saturated polyester wastes.

The following descriptions will clarify the above described and other objects of the present invention.

As the result of the research work to attain the above described objects, the present inventors have discovered that the alcoholysis of a high molecular weight terephthalic saturated polyester by means of a polyhydric alcohol yields a low molecular weight terephthalic oligoester, that a urethane modified acrylate can be produced by preparing a prepolymer containing isocyanate end group, wherein the said prepolymer is prepared by reacting a low molecular weight terephthalic oligoester having an acid value of less than 20 or a mixture of the said terephthalic oligoester and other polyhydric alcohol(s) with an organic diisocyanate, in which reaction the sum of the stoichiometric amounts of the hydroxyl group and the carboxyl group in the said oligoester or the said mixture is less than the stoichiometric amount of the isocyanate group of the said diisocyanate, or in the form of a formula (OH + COOH)/NCO <1, and reacting the said prepolymer with an acrylate or methacrylate containing hydroxyl group and a urethane modified acrylate resin can be produced by mixing the above urethane modified acrylate with an unsaturated polymerisable monomer and that the above urethane modified acrylate and urethane modified acrylate resin which is characterized by high elongation, high strength and excellent corrosion resistance are useful for the production of castings, moldings, adhesives, coatings, primers, varnishes, inks and the like.

The present invention has been attained due to the new discoveries described above.

DETAILED DESCRIPTION OF THE INVENTION

The urethane modified acrylate in the present invention is expressed by the following general formula (I),

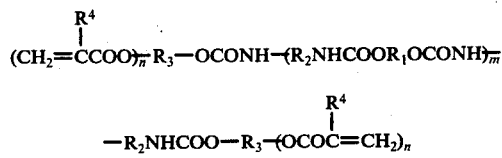

$$(CH_2=CCOO)_{\overline{n}}R_3-OCONH-(R_2NHCOOR_1OCONH)_{\overline{m}}$$

$$-R_2NHCOO-R_3-(OCOC=CH_2)_n \quad (I)$$

(where $R_1$ is a terephthalic oligoester residue, $R_2$ is an organic diisocyanate residue, $R_3$ is a polyhydric alcohol residue, $R_4$ is a hydrogen atom or a methyl group, $m$ is a number not more than 5 and $n$ is an integer from 1 through 4), has vinyl groups at both ends of the molecule and is capable of radical polymerization.

The said urethane modified acrylate is mixed with an unsaturated polymerisable monomer to obtain a urethane modified acrylate resin which is also capable of radical polymerization.

The terephthalic oligoester residue described above is a residue remained by removing the hydroxyl group from the molecular formula of the oligoester and desirably a residue derived from a terephthalic oligoester having an acid value of less than 20 and an average molecular weight of from 200 to 2000.

The organic diisocyanate residue described above is a residue remained by removing isocyanate group from the molecular formula of the organic diisocyanate.

The polyhydric alcohol residue described above is a residue remained by removing hydroxyl group from the molecular formula of the polyhydric alcohol.

The processes for producing the urethane modified acrylate in the present invention are the following two:

1. A process for producing the urethane modified acrylate characterized by preparing a prepolymer containing isocyanate end group, wherein the said prepolymer is prepared by reacting a low molecular weight terephthalic oligoester having an acid value of less than 20 or a mixture of the said terephthalic oligoester and other polyhydric alcohols with an organic diisocyanate, in which reaction the sum of the stoichiometric amounts of the hydroxy group and the carboxyl group in the said oligoester or the said mixture is less than the stoichiometric amount of the isocyanate group of the said diisocyanate, or in the form of a formula (OH + COOH)/NCO < 1, and reacting the prepolymer with an acrylate or methacrylate containing hydroxy group.

2. process for producing the urethane modified acrylate characterized by reacting an organic diisocyanate with an acrylate or methacrylate containing hydroxy group in which reaction the sum of the stoichiometric amounts of the hydroxyl group is less than the stoichiometric amount of the isocyanate group of the said diisocyanate, or in the form of a formula OH/NCO < 1 and subsequently reacting with a low molecular weight terephthalic oligoester having an acid value of less than 20 or a mixture of the said terephthalic oligoester and other polyhydric alcohol(s).

The low molecular weight terephthalic oligoester used in the present invention, hereinafter called simply oligoester, contains polycarboxylic acid(s) consisting mainly of terephthalic acid as the acid component and polyhydric alcohol(s) as the alcohol component and have molecular weight of from 200 to 2000 and have an acid value of less than 20, preferably less than 15. According to new finding by the present inventors, when an oligoester having an acid value of more than 20 is reacted with a diisocyanate to obtain a urethane modified acrylate and a urethane modified acrylate resin, bubbling occurs during curing. The bubbling becomes aggravated with increase of the acid value of the oligoester. Furthermore, when the acid value of the oligoester exceeds 20, neither clear urethane modified acrylate nor clear urethane modified acrylate resin can be obtained. The transparency of the urethane modified acrylate and urethane modified acrylate resin increasingly reduces with further increase of the acid value of the oligoester.

While the oligoester in the present invention consists mainly of terephthalic acid as the said acid component, it may contain small amount of other polycarboxylic acid(s) exemplified by saturated dicarboxylic acids such as isophthalic acid, orthophthalic acid or its anhydride, naphthalenedicarboxylic acid, succinic acid, adipic acid, azelaic acid, sebacic acid, dodecanedicarboxylic acid, tetrahydroorthophthalic acid or its anhydride, hexahydroorthophthalic acid or its anhydride, halogenated orthophthalic acids or its anhydrids, 3,6-endomethylene-1, 2, 3, 6-tetrahydroorthophthalic acid or its anhydride, pyromellitic acid or its anhydride, trimellitic acid or its anhydride or the like and unsaturated dicarboxylic acids such as fumaric acid, maleic acid, citraconic acid, itaconic acid, or their anhydrides, or the like. It is desirable that the amount of terephthalic acid is more than 50% by mol on the basis of the total polycarboxylic acid component.

Suitable examples of the said polyhydric alcohol component of the above oligoester are glycols such as ethylene glycol, propylene glycol, 1,3-butylene glycol, trimethylene glycol, 1,4-butanediol, pentamethylene glycol, 1,6-hexanediol, diethylene glycol, dipropylene glycol, polyethylene glycol, polypropylene glycol, neopentyl glycol, 2,2,4-trimethyl-1,3-pentanediol, cyclohexanediol, dimethylol cyclohexane, hydrogenated bisphenols, alkylene oxide addition products of hydrogenated bisphenols, alkylene oxide addition products of bisphenols, alkylene oxide addition products of halogenated bisphenols, or the like and polyhydric alcohol(s) having more than three hydroxy groups such as trimethylolethane, trimethylolpropane, glycerine, pentaerythritol, or the like. Preferably, the polyhydric alcohol component consists mainly of glycol(s). Neopentyl glycol is the most desirable component for the above oligoester.

The examples of the said oligoester include oligoesters of from low molecular weight bisglycol esters of terephthalic acid such as bis(hydroxyethyl)-terephthalate, molecular weight 254, bis(2-hydroxypropyl) terephthalate, bis(4-hydroxybutyl) terephthalate, bis(2,2-dimethyl-3-hydroxypropyl)terephthalate, or the like to oligoesters of a molecular weight of 2000 consisting of terephthalic acid and polyhydric alcohol(s) and bisglycol esters such as bis(polyoxyethylene)terephthalate, bis(polyoxypropylene)terephthalate, or the like.

As described before, in the said oligoester, a small amount of polycarboxylic acid(s) other than terephthalic acid as the main component may be contained. The polyhydric alcohol(s) used in the preparation of the said oligoester may remain in the said oligoester as free polyhydric alcohol(s).

A small amount of monoglycolester of terephthalic acid may also remain in the said oligoester.

An oligoester increased in a molecular weight but having an average molecular weight of not more than 2000 obtained by reacting a low molecular weight oligoester with a polycarboxylic acid or a mixture of polycarboxylic acid(s) and polyhydric alcohol(s) may also be used in the processes in the present invention.

The molecular weight of the said oligoester and kinds and molar ratios of the polyhydric alcohol(s) used in the present invention may be selected in order to suit the desired final product. More than two oligoesters with different molecular weight consisting of the same components may be used in the desired weight ratio. More than two oligoesters consisting of different components may also be used in the desired weight ratio.

The said oligoester can be prepared by the alcoholysis of a high molecular weight terephthalic polyester or its waste by using polyhydric alcohol(s). Alternatively, the said oligoester may also be prepared by reacting terephthalic acid or, when necessary, a mixture of terephthalic acid and a small amount of other polycarboxylic acid(s) or their ester forming derivative(s) with polyhydric alcohol(s) or with alkylene oxide(s) by a conventional procedure of direct esterification or ester exchange reaction. The above two preparation methods may be combined.

The said oligoester may, when necessary, be used together with the polyhydric alcohol(s).

The examples of the above polyhydric alcohol(s) are such as the ones described above as the examples of the polyhydric alcohol component of the above oligoester. Specific polyhydric alcohol used together with the said oligoester may be selected in order to suit the desired final product. More than two polyhydric alcohol(s) may be used together with the said oligoester.

Any molar ratio of the oligoester and polyhydric alcohol may be used, and preferably the molar ratio may usually be in the range of from 40:60 to 100:0.

Examples of the organic diisocyanates used in the present invention are 2,4-tolylene diisocyanate, 2,6-tolylene diisocyanate, metaphenylene diisocyanate, diphenylmethane diisocyanate, hexamethylene diisocyanate, xylylene diisocyanate, bis(isocyanate methyl)cyclohexane and the like.

These organic diisocyanates may be used independently or in a combination.

The acrylates or methacrylates containing hydroxy group used in the present invention may be prepared either by reacting acrylic acid or methacrylic acid with a monoepoxy compound or by reacting acrylic acid or methacrylic acid or its ester forming derivative with a polyhydric alcohol. In the above reaction, the molar ratio of the acrylic acid or methacrylic acid to the polyhydric alcohol is less than 1 when the polyhydric alcohol is a diol, less than 2 when the polyhydric alcohol is a triol and less than 3 when the polyhydric alcohol is a tetraol. The examples of the acrylates containing hydroxy group are monoacrylates or monomethacrylates of the diols such as ethyleneglycol monoacrylate, ethyleneglycol monomethacrylate, 1,2-propyleneglycol monoacrylate, 1,2-propyleneglycol monomethacrylate, 1,3-propanediol monoacrylate, 1,3-propanediol monomethacrylate, 1,4-butanediol monoacrylate, 1,4-butanediol monomethacrylate, 2-butene-1,4diol monoacrylate, 2-butene-1,4-monomethacrylate, 1,6-hexanediol monoacrylate, 1,6-hexanediol monomethacrylate, diethylene glycol monoacrylate, diethylene glycol monomethacrylate, dipropylene glycol monoacrylate, dipropylene glycol monomethacrylate, polyoxypropylene glcycol monoacrylate, polyoxypropylene glycol monomethacrylate, polyoxyethylene glycol monoacrylate, polyoxyethylene glycol monomethacrylate, monoacrylates or monomethacrylates of ethylene oxide or propylene oxide addition products of bisphenol A, monoacrylates or monomethacrylates of ethylene oxide or propylene oxide addition products of hydrogenated bisphenol A, or the like, monoacrylates or bisacrylates or monomethacrylates or bismethacrylates of the triols such as trimethylolethane monoacrylate, trimethylolethane bisacrylate, trimethylolethane monomethacrylate, trimethylolethane bismethacrylate, trimethylolpropane monoacrylate, trimethylolpropane bisacrylate, trimethylolpropane monomethacrylate, trimethylolpropane bismethacrylate, glycerine monoacrylate, glycerine bisacrylate, glycerine monomethacrylate, glycerine bismethacrylate, monoacrylates, bisacrylates, monomethacrylates or bismethacrylates of ethylene oxide or propylene oxide addition products of trimethylolethane, trimethylolpropane or glycerin, or the like, bisacrylates or trisacrylates or bismethacrylates or trismethacrylates of polyhydric alcohols having more than three hydroxy groups such as pentaerythritol bisacrylate, pentaerythritol trisacrylate, pentaerythritol bismethacrylate, pentaerythritol trismethaerylate, or the like. Drying and semidrying fatty acid esters containing hydroxy group which are prepared by reacting a monoepoxy compound with a drying or semidrying fatty acid may also be used.

The following description will be detailed in the process (1) for the production of the urethane modified acrylate in the present invention.

In the reaction between the said oligoester and the organic diisocyanate, and optionally, between the said oligoester mixed with the polyhydric alcohol(s) and the organic diisocyanate, the sum of the stoichiometric amounts of the hydroxyl group and carboxyl group in the oligoester and the hydroxyl group in the polyhydric alcohol is less than that of the isocyanate group in the above diisocyanate, or as expressed in the form of a formula: (OH + COOH)/NCO < 1. Preferably, the formula should be (OH + C00H)/NCO = 0.4 − 0.8.

In the process (1) in the present invention, the prepolymer containing isocyanate end group is obtainable as far as the above stoichiometric ratio is adopted in the above reaction. The above reaction is carried out in the medium of either unsaturated polymerisable monomer inactive to the isocyanate group or non-polymerisable compound inactive to the isocyanate group, at a temperature in the range of from 20° C to 80° C, preferably from 50° C to 80° C, and in the presense or absense of a catalyst. Examples of the above unsaturated polymerisable monomers inactive to the isocyanate group are styrene type monomers such as styrene, vinyltoluene, monochlorostyrene, tert-butylstyrene, divinylbenzene, or the like, acrylate type or methacrylate type monomers such as methylcrylate, methylmethacrylate, ethylacrylate, ethylmethacrylate, n-propylacrylate, n-propylmethacrylate, n-butylacrylate, n-butylmethacrylate, benzylacrylate, benzylmethacrylate, ethyleneglycol bisacrylate, ethyleneglycol bismethacrylate, propyleneglycol bisacrylate, propyleneglycol bismethacrylate, diethyleneglycol bisacrylate, diethyleneglycol bismethacrylate, trimethylolethane trisacrylate, trimethylolethane trismethacrylate, trimethylolpropane trisacrylate, trimethylolpropane trismethacrylate, or the like, vinylester type monomrs such as vinyl acetate, vinyl propionate, vinyl isopropionate, or the like, allyl type monomers such as diallyl phthalates, diallyl isophthalate, diallyl fumarate, or telike and vinyl nitrile type monomers such as acrylonitrile, methacrylonitrile, or the like.

The examples of the above non-polymerisable compounds inactive to the isocyanate group are aromataic compounds such as benzene, toluene, xylene, or the like and halogenated hydrocarbons such as methylenechloride, ethylenechloride, vinylidenechloride, or the like.

The examples of suitable catalysts in the above reaction are triethylenediamine, triethylamnine, dibuthyltindulaurate and dimethyl octyltin, or the like.

The prepolymer containing isocyanate end group obtained in the above reaction is subsequently reacted with an acrylate or methacrylate containing hydroxyl group to obtain the aforementioned urethane modified acrylate. This second step reaction may be carried out in the medium used in the first step reaction, in another medium or without the medium.

In the above second step reaction, the amount of the acrylate or methacrylate containing hydroxyl group is desirably more than the stoichiometric amount of the isocyanate group in the prepolymer containing isocyanate end group, or as expressed in the form of a formula, OH/NCO > 1.

More desirably, the ratio of the hydroxy group to the isocyanate group should be in the range of from 1.05 to 1.8, or as expressed in the form of a formula, OH/NCO = 1.05 − 1.8.

It improves resistance to corrosion and elongation that the hydroxy group in the acrylate or the methacrylate containing hydroxy group is in excess of the stoichiometric amount of the isocyanate group and accordingly, an excess amount of the said acrylate or methacrylate remains unreacted in the reaction product.

The following another description will be detailed in the process (2) for the production of the urethane modified acrylate in the present invention.

In the reaction between the organic diisocyanate and the acrylate or methacrylate containing hydroxyl group, the stoichiometric amount of the hydroxyl group in the above acrylate or methacrylate is less than that of the isocyanate group in the diisocyanate, or as expressed in the form of a formula, OH/NCO < 1. Preferably, the formula should be OH/NCO = 0.3 - 0.8.

The above reaction is carried out in the medium of either unsaturated polymerisable monomer inactive to the isocyanate group or non-polymerisable compound inactive to the isocyanate group at a temperature in the range of from 20° C to 80° C, preferably from 50° C to 70° C, and in the presense or absense of a catalyst.

The product obtained from the above reaction is thereafter reacted either with a low molecular weight terephthalic oligoester having an acid value of less than 20 or with the said oligoester and a polyhydric alcohol to obtain a urethane modified acrylate.

The above reaction is carried out in the medium used in the first step reaction or in the other medium or in the absense of the medium. The medium used in the process (2) is either an unsaturated polymerisable monomer inactive to the isocyanate group or a non-polymerisable compound inactive to the isocyanate group and identical to the medium used in the said process (1).

The urethane modified acrylate obtained in the above processes (1) or (2) is a solid or viscous polymer capable of radical homopolymerization. For this reason, the urethane modified acrylate may be used as moldings, adhesives, coatings, primers, varnishes, inks, or the like.

The urethane modified acrylate may subsequently be mixed with an unsaturated polymerisable monomer to obtain a urethane modified acrylate resin. The reaction of the process (1) or (2) in the present invention, is carried out in the unsaturated polymerisable monomer inactive to the isocyanate group to provide a urethane modified acrylate resin containing the unsaturated polymerisable monomer, unless the monomer is removed in an additional process. When the said reaction is carried out in the non-polymerisable compound inactive to the isocyanate group, the said compound may or may not be removed before mixing the reaction product with the unsaturated polymerisable monomer to provide the urethane modified acrylate resin. The ratio of the urethane modified acrylate to the unsaturated polymerisable monomer should fall in the range of from 95 : 5 to 5 : 95 by weight %, desirably in the range of 70 : 30 to 30 : 70 by weight %.

The examples of the unsaturated polymerisable monomers are styrene type monomers such as styrene, vinyltoluene, monochlorostyrene, tert-butylstyrene, divinylbenzene, or the like, acrylate type or methacrylate type monomers such as methylacrylate, methylmethacrylate, ethylacrylate, ethylmethacrylate, n-propylacrylate, n-propylmethacrylate, n-butylacrylate, n-butylmethacrylate, benzylacrylate, benzylmethacrylate, ethyleneglycol bisacrylate, ethyleneglycol bismethacrylate, ethyleneglycol monoacrylate, ethyleneglycol monomethacrylate, propyleneglycol monoacrylate, propyleneglycol monomethacrylate, trimethylolpropane trisacrylate, trimethylolpropane trismethacrylate, or the like, vinylester type monomers such as vinyl acetate, vinyl propionate, vinyl isopropionate, or the like, allyl type monomers such as diallyl phthalate, diallyl isophthalate, diallyl fumarate, or the like, vinyl nitrile type monomers such as acrylonitrile, methacrylonitrile, or the like, vinylpyrolidone and so forth.

The urethane modified acrylate may be mixed with an unsaturated polymerisable monomer having a melting point above the room temperature such as n-vinylcarbazol, maleimide, acrylamide, triallylcyanulate, diallyl phthalate prepolymer, or the like, to provide a solid urethane acrylate resin.

The urethane modified acrylate and its resin in the present invention may be cured and molded in the same manner as in the conventional unsaturated polyester resin or the other radically curable thermosetting resins.

The examples of the curing catalysts for the urethane modified acrylate and its resin are organic peroxides such as benzoyl peroxide, tert-butyl peroxybenzoate, tert-butyl peroxyoctanoate, methylethylketone peroxide, cyclohexanone peroxide, lauroyl peroxide, dicumyl peroxide, cumenehydroperoxide, or the like. The urethane modified acrylate and its resin can also be cured by the other radical initiation such as UV light, electron beam and radioactive radiation. In addition to the curing catalyst, promoter such as dimethylaniline, diethylaniline, cobalt octanoate, cobalt naphthanate, or the like may be used. In the case of UV light curing, UV light sensitizer may be used.

Various kinds of fillers, additives, stabilizers and reinforcements may be used together with the urethane modified acrylate or its resin in the present invention in the same manner as in the conventional unsaturated polyester resin or the other radically curable thermosetting resins.

The urethane modified acrylate has a good adhesive ability to metals and other materials.

The urethane modified acrylate resin in the present invention is a resin of high heat distortion temperature and excellent corrosion resistance in addition to the excellent properties of high elongation and high strength. Accordingly, the urethane modified acrylate resin in the present invention useful for filament winding molding, gel coat, corrosion resistant linings, primers and the like in addition to uses of the conventional moldings.

The following examples will illustrate the present invention more fully.

In the examples, "part" and "%" mean part by weight and % by weight, respectively.

The viscosity of the resins was measured at 25° C by using a Brookfield type viscometer. Figures of various properties were obtained by following the measurement procedure stipulated in JIS K6919 and K6911.

The unreinforced casting plate used in the measurements of physical properties and corrosion resistance were prepared by adding methylethylketone peroxide (1.0% by weight; a mineral spirit solution of 55% by weight) and cobalt naphthanate (0.3% by weight; a terpene solution, Co content = 6%) to the above urethane modified acrylate resin and curing at room temperature by following a post curing at 120° C for 2 hours.

EXAMPLE 1

A stainless steel autoclave equipped with stirrer, thermometer, nitrogen gas-introducing tube and partial condenser was charged with 960 parts of undrawn polyethyleneterephthalate staple fiber waste, 310 parts of ethylene glycol, 1740 parts of propylene oxide (2 mols) addition product of bisphenol A and 1.5 parts of triethylamine. The mixture was heated in an atmosphere of nitrogen under the pressure of 3 kg/cm$^2$ gauge at 235° C for 2 hours. The alcoholysis product thus obtained, namely a mixture of oligoester having an acid value of 12.3 and glycols, was cooled to room temperature and mixed with 7437 parts of styrene. To this mixture, 3 parts of hydroquinone was added and the mixture was heated to 50° C with stirring.

To this mixture, 3480 parts (OH + COOH)/(NCO) = 0.5) of 2,4-tolylene diisocyanate was added slowly during 2 hours so as to keep the reaction mixture below 80° C. During the course of reaction, the mixture became completely clear. To the prepolymer containing isocyanate end group thus obtained in the above reaction, 2600 parts of ethyleneglycol monomethacrylate was added and reacted below 80° C. The viscosity of the clear urethane modified acrylate resin obtained in the above reaction and consisting of a urethane modified acrylate and styrene was 2.0 poise.

An unreinforced casting plate was prepared from the resin according to the procedure specified before.

Physical properties of the casting plate were obtained as listed in Table 1.

Table 1

| | | |
|---|---|---|
| Barcol hardness | | 45 |
| Heat distortion temperature | (° C) | 114 |
| Flexural strength | (kg/mm$^2$) | 14.0 |
| Tensile strength | (kg/mm$^2$) | 6.0 |
| Elongation | (%) | 6.0 |

As illustrated in Table 1, the urethane modified acrylate resin had very high tensile strength and very high elongation in spite of very high heat distortion temperature and hardness. A casting plate of the resin was soaked in boiling water for 500 hours to be without change in appearance. The same casting plate was soaked in boiling aqueous solution of 10% NaOH for 200 hours to be without change in appearance.

When, instead of the alcoholysis product containing a oligoester having an acid value of 12.3 in the present example, an alcoholysis product containing an oligoester having an acid value of 25.3 obtained in a manner similar to the present example was used and a urethane modified acrylate resin was produced in the same manner as in the present example, the urethane modified acrylate resin obtained was opaque.

EXAMPLE 2

The same autoclave as in Example 1 was charged with 960 parts of polyethyleneterephthalate film waste, 310 parts of ethylene glycol, 760 parts of propylene glycol and 1.5 parts of triethylamine, and the mixture was heated in an atmosphere of nitrogen under the pressure of 3 kg/cm$^2$ gauge at 235° C for 1.5 hours. The alcoholysis product thus obtained was cooled to 150° C, added with 830 parts of terephthalic acid and further reacted in an atmosphere of nitrogen under the pressure of 4 kg/cm$^2$ gauge at 235° C for 2 hours. The oligoester thus obtained having an acid value of 3.8 was cooled to room temperature, mixed with 7355 parts of styrene, added with 3 parts of hydroquinone and heated to 50° C with stirring.

Thereafter, 3480 parts (OH + COOH)/(NCO) = 0.5) of 2,4-tolylene diisocyanate was added slowly to the mixture during 2 hours so as to keep the reaction mixture below 80° C.

At the end of this reaction, the reaction mixture became clear. Then, 2650 parts (OH)/(NCO) = 1.04) of ethyleneglycol monomethacrylate was added dropwise to the prepolymer containing isocyanate end group in such a manner to keep the reaction mixture below 80° C. The viscosity of the clear urethane modified acrylate resin thus obtained in the above reaction was 2.4 poise.

An unreinforced casting plate was prepared from the resin according to the procedure specified before. Physical properties of the casting plate were obtained as listed in Table 2.

Table 2

| | | |
|---|---|---|
| Barcol hardness | | 46 |
| Heat distortion temperature | (° C) | 114 |
| Flexural strength | (kg/mm$^2$) | 13.8 |

Table 2-continued

| | | |
|---|---|---|
| Tensile strength | (kg/mm$^2$) | 6.2 |
| Elongation | (%) | 6.3 |

EXAMPLE 3

The same autoclave as in Example 1 was charged with 960 parts of polyethyleneterephthalate film waste, 310 parts of ethylene glycol, 1040 parts of neopentyl glycol and 1.5 parts of triethylamine. The mixture was heated in an atmosphere of nitrogen under the pressure of 3 kg/cm$^2$ gauge at 235° C for 1.5 hours. The alcoholysis product thus obtained was cooled to 180° C, added with 830 parts of terephthalic acid and further reacted in an atomsphere of nitrogen under the pressure of 4 kg/cm$^2$ gauge at 235° C for 2 hours. The oligoester thus obtained having an acid value of 4.1 was cooled to room temperature, mixed with 7584 parts of styrene, added with 3 parts of hydroquinone and was heated to 50° C with stirring.

Thereafter, 3480 parts (OH + COOH)/(NCO) = 0.5) of 2,4-tolylene diisocyanate was added to the reaction mixture during 2 hours so as to keep the reaction mixture below 80° C. At the end of this reaction, the reaction mixture became clear. Then, 2650 parts (OH/NCO = 1.04) of ethyleneglycol monomethacrylate was added dropwise to the prepolymer mixture in such a manner as to keep the reaction mixture below 80° C. The viscosity of the clear urethane modified acrylate resin thus obtained was 2.3 poise.

An unreinforced casting plate was prepared from the resin according to the procedure specified before. Physical properties of the casting plate were obtained as listed in Table 3.

Table 3

| | | |
|---|---|---|
| Barcol hardness | | 41 |
| Heat distortion temperature | (° C) | 112 |
| Flexural strength | (kg/mm$^2$) | 14.0 |
| Tensile strength | (kg/mm$^2$) | 6.3 |
| Elongation | (%) | 6.5 |

A casting plate of the resin was soaked in boiling water for 500 hours to be without change in appearance. The same casting plate was soaked in boiling aqueous solution of 10% NaOH for 200 hours to be without change in appearance.

When, instead of the oligoester having an acid value of 4.1 in the present example, oligester having an acid value of 27.7 obtained in the same manner as in the present example was used and a urethane modified acrylate resin was produced in the same manner as in the present example, the urethane modified acrylate resin obtained was opaque.

EXAMPLE 4

The same autoclave as in Example 1 was charged with 960 parts of polyethyleneterephthalate film waste, 310 parts of ethylene glycol, 1340 parts of dipropylene glycol and 1.5 parts of triethylamine. The mixture was heated in an atmosphere of nitrogen under the pressure of 3 kg/cm$^2$ gauge at 235° C for 1.5 hours. The above reaction gave an alcoholysis product, which was subsequently cooled to 150° C, added with 830 parts of terephthalic acid and further reacted in an atmosphere of nitrogen under the pressure of 4 kg/cm$^2$ gauge at 235° C for 2 hours to give an oligoester having an acid value of 3.8. The oligoester thus obtained was cooled to room temperature, mixed with 7830 parts of styrene, added with 3 parts of hydroquinone and was heated to 50° C with stirring.

Thereafter, 3480 parts (OH + COOH)/(NCO) = 0.5) of a mixture of 2,4-and 2,6-tolylene diisocyanate (80/20 by weight) was added slowly to the mixture during 2 hours so as to keep the reaction mixture below 80° C. At the end of this reaction, the reaction mixture became clear. Then, 2650 parts (OH)/NCO) = 1.04) of ethyleneglycol monomethacrylate was added dropwise to the prepolymer mixture in such a manner as to keep the reaction mixture below 80° C. The viscosity of the clear urethane modified acrylate resin thus obtained was 15 poise.

An unreinforced casting plate was prepared from the resin according to the procedure specified before. Physical properties of the casting plate were obtained as listed in table 4.

Table 4

| | | |
|---|---|---|
| Barcol hardness | | 40 |
| Heat distortion temperature | (° C) | 120 |
| Flexural strength | (kg/mm$^2$) | 13.7 |
| Tensile strength | (kg/mm$^2$) | 6.3 |
| Elongation | (%) | 6.6 |

EXAMPLE 5

The same autoclave as in Example 1 was charged with 1440 parts of undrawn polyethyleneterephthalate staple fiber waste, 558 parts of ethylene glycol and 1.5 parts of triethylamine, and the mixture was heated in an atmosphere of nitrogen under the pressure of 3 kg/cm$^2$ gauge at 235° C for 1.5 hours to give an alcoholysis product containing an oligoester having an acid value of 6.1. The alcoholysis product thus obtained was then ground into pieces mixed with 7138 parts of styrene, added with 647 parts of hydrogenated bisphenol A and 3 parts of hydroquinone and then heated to 50° C with stirring.

Thereafter, 3480 parts (OH + COOH)/(NCO) 32 0.5) of 2,4-tolylene diisocyanate was added slowly to the reaction mixture during 2 hours so as to keep the reaction mixture below 80° C. At the end of this reaction, the reaction mixture became clear. Then, 2600 parts (OH/NCO = 1.00) of ethyleneglycol monomethacrylate was added dropwise to the prepolymer mixture in such a manner as to keep the reaction mixture below 80° C. The viscosity of the clear urethane modified acrylate resin thus obtained was 6.3 poise.

An unreinforced casting plate was prepared from the resin according to the procedure specified before. Physical properties of the casting plate were obtained as listed in Table 5.

Table 5

| | | |
|---|---|---|
| Barcol hardness | | 40 |
| Heat distortion temperature | (° C) | 116 |
| Flexural strength | (kg/mm$^2$) | 11.6 |
| Tensile strength | (kg/mm$^2$) | 6.1 |
| Elongation | (%) | 6.6 |

A casting plate was soaked in boiling water for 500 hours to be without change in appearance. The same casting plate was soaked in boiling aqueous solution of 10% NaOH for 200 hours to be without change in appearance.

EXAMPLE 6

The same autoclave as in Example 1 was charged with 960 parts of undrawn polyethyleneterephthalate/isophthalate (9/1 by mol) copolymer staple fiber waste, 310 parts of ethylene glycol, 1740 parts of propylene oxide (2 mols) addition product of bisphenol A and 1 part of ammonium titanium oxalate, and the mixture was heated in an atmosphere of nitrogen under the pressure of 3 kg/cm² gauge at 235° C for 1.5 hours to give an alcoholysis product containing an oligoester having an acid value of 5.3. The product was then cooled to room temperature, mixed with 7437 parts of styrene, added with 3 parts of hydroquinone and 1.5 parts of triethylamine and heated to 50° C with stirring.

Thereafter, 3480 parts (OH + COOH)/(NCO) + 0.5) of 2,4-tolylene diisocyanate was added slowly to the reaction mixture during 2 hours so as to keep the reaction mixture below 80° C. At the end of this reaction, the reaction mixture became clear. Then, 2600 parts (OH/NCO + 1.00) of ethyleneglycol monomethacrylate was added dropwise to the prepolymer mixture in such a manner as to keep the reaction mixture below 80° C. The viscosity of the clear urethane modified acrylate resin thus obtained was 2.3 poise.

An unreinforced casting plate was prepared from the resin according to the procedure specified before. Physical properties of the casting plate were obtained as listed in Table 6.

Table 6

| | | |
|---|---|---|
| Barcol hardness | | 43 |
| Heat distortion temperature | (° C) | 113 |
| Flexural strength | (kg/mm²) | 14.8 |
| Tensile strength | (kg/mm²) | 6.2 |
| Elongation | (%) | 7.2 |

EXAMPLE 7

The same autoclave as in Example 1 was charged with 960 parts of polyethyleneterephthalate/isophthalate (9/1 by mol) copolymer film waste, 310 parts of ethylene glycol, 1340 parts of dipropylene glycol and 1 part of ammonium titanium oxalate, and the mixture was heated in an atmosphere of nitrogen under the pressure of 3 kg/cm² gauge at 235° C for 1.5 hours to give an alcoholysis products which was subsequently cooled to 180° C, added with 830 parts of terephthalic acid and further reacted at 235° C for 2 hours in an atmosphere of nitrogen under the pressure of 4 kg/cm² gauge to give an oligoester having an acid value of 2.3. The oligoester was cooled to room temperature, mixed with 6000 parts of benzene, added with 3 parts of hydroquinone and 1.5 parts of triethylamine and was heated to 50° C with stirring.

Thereafter, 2610 parts ((OH + COOH)/NCO = 0.67) of 2,4-tolylene diisocyanate was added slowly during 2 hours so as to keep the reaction mixture below 80° C. At the end of this reaction, the reaction mixture became clear. Then, 1400 parts (OH/NCO = 1.01) of ethyleneglycol monomethacrylate was added dropwise to the prepolymer mixture in such a manner as to keep the reaction mixture below 80° c.

The clear solution thus obtained was cooled to room tmeperature and added with 30 parts of benzoyl peroxide. The benzene was then removed under vacuum below 50° C to give a urethane modified acrylate containing peroxide. The urethane modified acrylate thus obtained was spread on a plywood board in an amount of 1.5 g/100cm². A patterned paper was placed on the coated plywood board and pressed at 80° C under the pressure of 1 kg/cm² for 30 minutes to give a board decorated with the patterned paper firmly bonded.

EXAMPLE 8

The same autoclave as in Example 1 was charged with 1100 parts of polybutyleneterephthalate molding waste, 1340 parts of dipropylene glycol and 1 part of ammonium titanium oxalate were heated at 235° C for 1.5 hours in an atmosphere of nitrogen under the pressure of 3 kg/cm² gauge to give an alcoholysis product containing an oligoester having an acid value of 5.4. The product was cooled to room temperature and was mixed with 6000 parts of toluene. To this mixture, 3 parts of hydroguinone and 1.5 parts of triethylamine was added and the mixture was heated to 50° C with stirring.

Thereafter, 2610 parts ((OH + COOH)/NCO = 0.67) of 2,4-tolylene diisocyanate was added slowly during 2 hours so as to keep the reaction mixture below 80° C. At the end of this reaction, the reaction mixture became clear. Then 1400 parts (OH/NCO = 1.09) of ethyleneglycol monomethacrylate was added dropwise to the prepolymer mixture in such a manner as to keep the reaction mixture below 80° C. The clear solution thus obtained was cooled to room temperature and added with 45 parts of benzoyl peroxide. The toluene was then removed under vacuum below 50° C to give a urethane modified acrylate containing benzoyl peroxide.

The urethane modified acrylate thus obtained was spread between two wood boards in an amount of 2g/100cm² and pressed at 80° C under the pressure of 1 kg/cm² and pressed at 80° C under the pressure of 1 kg.cm² for 30 minutes to give a firmly adhered wood board.

EXAMPLE 9

The same autoclave as in Example 1 was charged with 166 parts of terephthalic acid, 229 parts of neopentyl glycol, 1.0 part of tin oxide as a catalyst and 1.5 parts of triethylamine, and the mixture was heated at 235° C for 2 hours in an atmosphere of nitrogen under the pressure of 4 kg/cm² gauge to give an oligoester having an acid value of 14.3. The oligoester thus obtained was cooled to room temperature, mixed with 774 parts of styrene and 0.15 parts of hydroquinone and heated to 50° C with stirring.

Thereafter, 348 parts ((OH + COOH)/NCO = 0.6) of 2,4-tolylene diisocyanate was added slowly during 20 minutes so as to keep the reaction mixture below 80° C. The reaction was further continued at 80° C for 2 hours. The prepolymer mixture thus obtained was added with 286 parts (OH/NCO = 1.4) of ethyleneglycol monomethacrylate and was reacted at 80° c for 2 hours to give a clear urethane modified acrylate resin having a viscosity of 3.5 poise.

An unreinforced casting plate was prepared from the resin according to the procedure specified before. Physical properties of the casting plate were obtained as listed in Table 7.

Table 7

| | | |
|---|---|---|
| Barcol hardness | | 44 |
| Heat distortion temperature | (° C) | 117 |
| Flexural strength | (kg/mm²) | 13.9 |
| Tensile strength | (kg/mm²) | 6.2 |
| Elongation | (%) | 7.8 |

A casting plate was soaked in boiling water for 500 hours to be without change in appearance. The same casting plate was soaked in boiling aqueous solution of 10% NaOH of 200 hours to be without change in appearance.

When, instead of oligoester having an acid value of 14.3 in the present example, an oligoester having an acid value of 30.5 obtained in a manner similar to the present example was used and a urethane modified acrylate resin was produced in the same manner as in the present example, the urethane modified acrylate resin obtained was opaque.

EXAMPLE 10

The same autoclave as in Example 1 was charged with 774 parts of styrene, 0.15 parts of hydroquinone, 348 parts of 2,4-tolylene diisocyanate and 286 parts (OH/NCO = 0.55) of ethyleneglycol monomethacrylate and the mixture was heated at 80° C for 1.5 hours to give a prepolymer containing isocyanate end group.

The prepolymer thus obtained was cooled to room temperature and mixed with 362 parts ((OH + COOH)/NCO = 1.33) of an oligoester prepared from terephthalic acid and neopentylglycol of the same quantity and in the same manner as in Example 9. The mixture was reacted at 80° C for 2 hours to give a clear urethane modified acrylate resin having a viscosity of 3.8 poise.

An unreinforced casting plate was prepared from the resin according to the procedure specified before. Physical properties of the casting plate were obtained as listed in Table 8.

Table 8

| | | |
|---|---|---|
| Barcol hardness | | 43 |
| Heat distortion temperature | (° C) | 115 |
| Flexural strength | (kg/mm$^2$) | 14.2 |
| Tensile strength | (kg/mm$^2$) | 6.7 |
| Elongation | (%) | 7.8 |

EXAMPLE II

The same autoclave as in Example 1 was charged with 7584 parts of styrene, 3 parts of hydroquinone, 3480 parts of 2,4-tolylene diisocyanate and 2650 parts (OH/NCO = 0.51) of ethyleneglycol monomethacrylate and the mixture was heated at 70° C for 2 hours to give a prepolymer containing isocyanate end group. The prepolymer thus obtained was cooled to room temperature and mixed with 2960 parts ((OH + COOH)/NCO = 1.02) of an oligoester prepared from polyethyleneterephthalate film waste, ethylene glycol and neopentyl glycol of the same quantity and in the same manner as in Example 3. The mixture was reacted at 80° C for 2 hours to give a clear urethane modified acrylate resin having a viscosity of 2.4 poise.

An unreinforced casting plate was prepared from the resin according to the procedure specified before. Physical properties of the casting plate were obtained as listed in Table 9.

Table 9

| | | |
|---|---|---|
| Barcol hardness | | 40 |
| Heat distortion temperature | (° C) | 111 |
| Flexural strength | (kg/mm$^2$) | 13.7 |
| Tensile strength | (kg/mm$^2$) | 6.3 |
| Elongation | (%) | 6.6 |

COMPARATIVE EXAMPLE 1

The same autoclave as in Example 1 was charged with 148 parts of phthalic anhydride and 229 parts of neopentyl glycol and the mixture was heated at 210° C for 2 hours under atmospheric pressure to give an oligoester having an acid value of 6.0. The oligoester thus obtained was reacted in the same manner as in Example 9 to give a clear urethane modified acrylate resin having a viscosity of 3.1 poise.

An unreinforced casting plate was prepared from the resin according to the procedure specified before.

Physical properties of the casting plate obtained as listed in Table 10.

Table 10

| | | |
|---|---|---|
| Barcol hardness | | 45 |
| Heat distortion temperature | (° C) | 97 |
| Flexural strength | (kg/mm$^2$) | 13.8 |
| Tensile strength | (kg/mm$^2$) | 5.6 |
| Elongation | (%) | 4.3 |

As clearly illustrated in Tables 7 and 10, replacement of terephthalic acid unit with orthophthalic acid unit in the urethane modified acrylate lowered the heat distortion temperature and the elongation of the cured resin.

When the casting plate was soaked in boiling water for 500 hours, cracks appeared in the plate.

COMPARATIVE EXAMPLE 2

A clear urethane modified acrylate resin having a viscosity of 4.2 poise was obtained in the same manner as in Example 9 except that isophthalic acid was used instead of terephthalic acid.

An unreinforced casting plate was prepared from the resin according to the procedure specified before.

Physical properties of the casting plate were obtained as listed in Table 11

Table 11

| | | |
|---|---|---|
| Barcol hardness | | 45 |
| Heat distortion temperature | (° C) | 99 |
| Flexural strength | (kg/mm$^2$) | 13.2 |
| Tensile strength | (kg/mm$^2$) | 5.3 |
| Elongation | (%) | 4.2 |

As clearly illustrated in Tables 7 and 11 replacement of terephthalic acid unit with isophthalic acid unit in the urethane modified acrylate lowered the heat distortion temperature and the elongation of the cured resin.

When the casting plate was soaked in boiling water for 500 hours, cracks appeared in the plate.

COMPARATIVE EXAMPLE 3

An oligoester having an acid value of 12.0 was prepared in the same manner as in Example 9.

An unsaturated polyester having an acid value of 14.0 was obtained by reacting 116 parts of fumaric acid with the above oligoester according to the conventional manner for the production of the unsaturated polyester.

The unsaturated polyester thus obtained was then dissolved in 454 parts of styrene to give an unsaturated polyester resin. The viscosity of the unsaturated polyester resin thus obtained was 5.3 poise.

Physical properties of an unreinforced casting plate prepared from the resin were obtained as listed in Table 12.

Table 12

| | | |
|---|---|---|
| Barcol hardness | | 37 |
| Heat distortion temperature | (° C) | 120 |
| Flexural strength | (kg/mm$^2$) | 11.4 |
| Tensile strength | (kg/mm$^2$) | 4.0 |
| Elongation | (%) | 2.2 |

COMPARATIVE EXAMPLE 4

The same autoclave as in Example 1 was charged with 498 parts of terephthalic acid and 479 parts of propylene glycol and the reaction was carried out in the same manner as in Example 9 to give an oligoester having an acid value of 13.0.

An unsaturated polyester having an acid value of 10.0 was obtained by reacting 348 parts of fumaric acid with the above oligoester according to the conventional manner for the production of the unsaturated polyester.

The unsaturated polyester thus obtained was dissolved in 1325 parts of styrene to give an unsaturated polyester resin.

The viscosity of the clear unsaturated polyester resin thus obtained was 2.1 poise.

Physical properties of an unreinforced casting plate prepared from the resin were obtained as listed in Table 13.

Table 13

| | | |
|---|---|---|
| Barcol hardness | | 37 |
| Heat distortion temperature | (° C) | 130 |
| Flexural strength | (kg/mm$^2$) | 12.0 |
| Tensile strength | (kg/mm$^2$) | 4.1 |
| Elongation | (%) | 2.3 |

COMPARATIVE EXAMPLE 5

The same autoclave as in Example 1 was charged with 1104.2 parts of propylene oxide (2 mols) addition product of bisphenol A and 348 parts of fumaric acid and the reaction was carried out according to the conventional manner for the production of the unsaturated polyester to give an unsaturated polyester having an acid value of 13.0.

The unsaturated polyester thus obtained was dissolved in 1100 parts of styrene to give an unsaturated polyester resin.

The viscosity of the clear unsaturated polyester resin thus obtained was 4.5 poise.

Physical properties of an unreinforced casting plate prepared from the resin were obtained as listed in Table 14.

Table 14

| | | |
|---|---|---|
| Barcol hardness | | 38 |
| Heat distortion temperature | (° C) | 113 |
| Flexural strength | (kg/mm$^2$) | 10.5 |
| Tensile strength | (kg/mm$^2$) | 3.9 |
| Elongation | (%) | 2.9 |

What is claimed is

1. A urethane modified acrylate which is expressed by the following general formula (I),

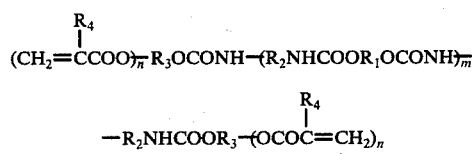

(I)

(where $R_1$ is a terephthalic oligoester residue, $R_2$ is an organic diisocyanate residue, $R_3$ is a polyhydric alcohol residue, $R_4$ is a hydrogen atom or methyl group, $m$ is a number not more than 5 and $n$ is an integer from 1 through 4).

2. The urethane modified acrylate according to claim (1), wherein the $R_1$ is the general formula (I) is a residue derived from a terephthalic oligoester having an average molecular weight of from 200 to 2,000 and having an acid value of less than 20.

3. The urethane modified acrylate according to claim (1), wherein the $R_1$ in the general formula (I) is a residue derived from a terephthalic bisglycolester having a molecular weight of from 254 to 2,000 and having an acid value of less than 20.

4. The urethane modified acrylate according to claim (1), wherein the $R_1$ in the general formula (I) is a residue derived from a terephthalic oligoester having an average molecular weight of from 200 to 2,000 and having an acid value of less than 20 which is obtained by the alcoholysis of a high molecular weight terephthalic saturated polyester with a polyhydric alcohol.

5. A urethane modified acrylate resin consisting of the urethane modified acrylate according to claim (1) and an unsaturated polymerisable monomer.

6. The urethane modified acrylate resin according to claim (5), wherein the ratio of the urethane modified acrylate and the unsaturated polymerisable monomer falls in the range of from 95:5 to 5:95 by weight.

7. The urethane modified acrylate resin according to claim (5), wherein the unsaturated polymerisable monomer is a styrene type monomer.

8. A process for producing a urethane modified acrylate characterized by preparing a prepolymer containing isocyanate end group, wherein the said prepolymer is obtained by reacting one or more compounds selected from the group consisting of a low molecular weight terephthalic oligoester having an acid value of less than 20 and a mixture of the said terephthalic oligoester and a polyhydric alcohol with an organic diisocyanate, in which reaction the sum of the stoichiometric amounts of the hydroxy group and the carboxyl group in the said compound (s) is less than the stoichiometric amount of the isocyanate group of the said organic diisocyanate, or in the form of a formula (OH + COOH)/NCO < 1, and subsequently reacting the said prepolymer with one or more compounds selected from the group consisting of an acrylate and methacrylate containing hydroxyl group.

9. The process according to claim (8), wherein the low molecular weight terephthalic oligoester having an acid value of less than 20 is an oligoester having an average molecular weight of 200 to 2,000 prepared by the alcoholysis of a high molecular weight terephthalic saturated polyester with a polyhydric alcohol.

10. The process according to claim (8), wherein the said two steps of the reaction are carried out in a medium of an unsaturated polymerisable monomer inactive to the isocyanate group.

11. The process according to claim (8), wherein the stoichiometric amount of the hydroxy group in the compound selected from the group consisting of an acrylate and methacrylate having hydroxyl group is more than the stoichiometric amount of the isocyanate group in the said prepolymer containing isocyanate end group.

12. The process according to claim (10), wherein the unsaturated polymerisable monomer inactive to the isocyanate group is a styrene type monomer.

13. A process for producing a urethane modified acrylate characterized by reacting an organic diisocyanate with a compound selected from the group consisting of an acrylate and methacrylate containing hydroxyl group in which reaction the stoichiometric amount of said hydroxy group of said compound is less than the stoichiometric amount of the isocyanate group of the said organic diisocyanate, or in the form of a formula OH/NCO < 1, and subsequently reacting the prepolymer obtained by the above reaction with one or more compounds selected from the group consisting of a low molecular weight terephthalic oligoester having an acid value of less than 20 and a mixture of the said terephthalic oligoester and a polyhydric alcohol.

* * * * *